United States Patent
Madigan et al.

(10) Patent No.: US 12,014,422 B1
(45) Date of Patent: Jun. 18, 2024

(54) INSTANT INSURANCE

(71) Applicant: Allstate Insurance Company, Northbrook, IL (US)

(72) Inventors: Regina Madigan, Mountain View, CA (US); Robert H. Johnson, Hoffman Estates, IL (US); Carolyn Parker, Libertyville, IL (US); Rothana Srey, Dekalb, IL (US); Nicholas A. Suizzo, Cody, WY (US); Sean P. Willett, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 980 days.

(21) Appl. No.: 14/273,129

(22) Filed: May 8, 2014

(51) Int. Cl.
 *G06Q 40/08* (2012.01)
(52) U.S. Cl.
 CPC .................................. *G06Q 40/08* (2013.01)
(58) Field of Classification Search
 CPC ......... G06Q 40/08; G06Q 50/22; G06Q 10/10
 USPC ............................................................ 705/4
 See application file for complete search history.

(56) References Cited

U.S. PATENT DOCUMENTS

| 5,655,085 | A  * | 8/1997  | Ryan ...................... G06Q 40/02 |
|           |      |         |                                705/4 |
| 7,873,527 | B2   | 1/2011  | Dordick et al.                        |
| 8,041,636 | B1   | 10/2011 | Hunter et al.                         |
| 8,077,927 | B1   | 12/2011 | Maltby, II                            |
| 8,106,769 | B1   | 1/2012  | Maroney et al.                        |
| 8,265,964 | B2   | 9/2012  | Read et al.                           |
| 8,271,308 | B2   | 9/2012  | Winkler                               |
| 8,280,633 | B1   | 10/2012 | Eldering et al.                       |
| 8,424,095 | B2   | 4/2013  | Masuoka et al.                        |
| 2002/0013717 | A1 * | 1/2002 | Ando ...................... G06Q 40/08 |
|            |      |         |                               235/105 |

(Continued)

FOREIGN PATENT DOCUMENTS

| EP | 2435972 A1 | 4/2012 | |
| WO | WO-2010062899 A1 * | 6/2010 | ......... G06Q 30/0201 |

(Continued)

OTHER PUBLICATIONS

Wahlström, J., Skog, I. and Händel, P., 2017. Smartphone-based vehicle telematics: A ten-year anniversary. IEEE Transactions on Intelligent Transportation Systems, 18(10), pp. 2802-2825. (Year: 2017).*

Handel, P., Skog, I., Wahlstrom, J., Bonawiede, F., Welch, R., Ohlsson, J. and Ohlsson, M., 2014. Insurance telematics: Opportunities and challenges with the smartphone solution. IEEE Intelligent Transportation Systems Magazine, 6(4), pp. 57-70. (Year: 2014).*

Wahlström, J., Skog, I. and Händel, P., May 2015. Driving behavior analysis for smartphone-based insurance telematics. In Proceedings of the 2nd workshop on Workshop on Physical Analytics (pp. 19-24). (Year: 2015).*

(Continued)

*Primary Examiner* — Eric T Wong
*Assistant Examiner* — John O Preston
(74) *Attorney, Agent, or Firm* — DINSMORE & SHOHL LLP (57) ABSTRACT

Systems and methods are provided for automatically changing or updating insurance coverage using a computer device. An insurance analyzer may receive data associated with an insurance user. The insurance analyzer may determine types of insurance coverage available and coverage amounts associated with the received user data. Based on the received data the insurance analyzer may automatically activate insurance coverage based on determined types of insurance available and coverage amounts. The insurance analyzer may also deactivate insurance coverage or change insurance coverage amounts based on determined user activity.

19 Claims, 6 Drawing Sheets

(56) References Cited

U.S. PATENT DOCUMENTS

| | | | |
|---|---|---|---|
| 2003/0182413 A1* | 9/2003 | Allen | H04L 12/145 709/223 |
| 2004/0168086 A1 | 8/2004 | Young et al. | |
| 2008/0015906 A1 | 1/2008 | Fox | |
| 2008/0055096 A1 | 3/2008 | Aylward | |
| 2008/0065427 A1 | 3/2008 | Helitzer et al. | |
| 2010/0131300 A1* | 5/2010 | Collopy | G06Q 40/08 701/33.4 |
| 2012/0072243 A1* | 3/2012 | Collins | G06Q 10/10 705/4 |
| 2012/0330690 A1 | 12/2012 | Goslinga et al. | |
| 2013/0204645 A1* | 8/2013 | Lehman | G06Q 40/08 705/4 |
| 2013/0339065 A1* | 12/2013 | Denning | G06Q 50/01 705/4 |

FOREIGN PATENT DOCUMENTS

| | | | |
|---|---|---|---|
| WO | 2012063268 A2 | 5/2012 | |
| WO | 2012135325 A2 | 10/2012 | |

OTHER PUBLICATIONS

"Experts Answer Tornado Questions," usatoday30.usatoday.com/weather/wtwistqa.htm, Jun. 5, 2013.

* cited by examiner

INSTANT INSURANCE

TECHNICAL FIELD

Aspects of the present disclosure generally relate to providing instant insurance or instant changes to existing insurance policies through a connected device.

BACKGROUND

Consumers often indicate that obtaining insurance coverage or making changes to an existing insurance policy can be time consuming. Obtaining new coverage or making changes to existing coverage requires providing detailed information to an insurance agent. The consumer must research information requested by the insurance agent in order to obtain a quote for the requested coverage or policy. As a result consumers often put off obtaining new coverage or request changes in coverage because of the time involved with obtaining quotes for new coverage or for requesting changes in coverage.

In addition, insurance needs by a consumer can quickly change and contacting an insurance agent to make changes can take a prolonged period of time which may prevent some consumers from actively reviewing and making policy adjustments. For instance, a consumer may travel between various homes during a given year. Each home may require different levels of insurance based upon when each home is occupied. Updating the policy for each home by calling an insurance agent multiple times during a year is time consuming and is usually overlooked by the consumer as it may not be a top consumer priority. Unfortunately, consumers that do not update their policies regularly may at times not have an appropriate type or amount of insurance or may in some instances be paying higher premiums for unnecessary amounts of insurance coverage.

Therefore, a need exists for an improved approach to enable consumers to quickly and efficiently make changes or updates to their insurance policies. Such changes should include adding new coverage and/or updating existing coverage without the need to remember to contact an insurance agent when such changes are needed.

SUMMARY

The following presents a simplified summary in order to provide a basic understanding of some aspects of the disclosure. The summary is not an extensive overview of the disclosure and is not intended to identify key or critical elements or to delineate the scope of protection sought. The following summary merely presents some concepts of the disclosure in a simplified form as an introduction to the more detailed description provided below.

An aspect of the disclosure provides a method of changing and/or updating an insurance policy based on user data. The data may be information associated with an insurance user's location, movement, and/or behaviors. In addition, the user data may include telematics data associated with the insurance user.

In an embodiment, an insurance system may include an insurance change/update analyzer to process and analyze insurance changes and/or updates from an insurance user. Upon receipt of new data regarding the insurance user, insurance change/update analyzer may determine if the data indicates that an insurance policy modification is needed. The insurance change/update analyzer may determine types of insurance coverage available and associated with the received insurance user activity. The insurance change/update analyzer may compare the determined types of insurance coverage available and associated with the received insurance user activity with the insurance user current insurance coverage. The insurance system may generate an insurance policy offer based on the comparison. The insurance system may transmit the generated insurance offer to the insurance user and automatically apply the changes or updates to the insurance user's policies.

In an aspect of the disclosure, telematics information may also be received from respective vehicles associated with the insurance user. A telematics analyzer along with the insurance change/update analyzer may determine that additional policy adjustments are to be automatically implemented to the insurance user policies.

In another aspect of the disclosure, an insurance analyzer may also deactivate insurance coverage or change insurance coverage amounts based on detected user activity.

A non-transitory computer-readable medium having computer-executable instructions stored thereon that carry out one or more of the steps described above is further provided. As used in this disclosure non-transitory computer-readable media include all types of computer-readable media with the sole exception of a transitory propagating signal.

The details of these and other embodiments of the disclosure are set forth in the accompanying drawings and description below. Other features and advantages of aspects of the disclosure will be apparent from the description and drawings.

DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps disclosed may be optional. It will also be appreciated that one or more components illustrated in the accompanying figures may be positioned in other than the disclosed arrangement and that one or more of the components illustrated may be optional.

DETAILED DESCRIPTION

Figure 1:
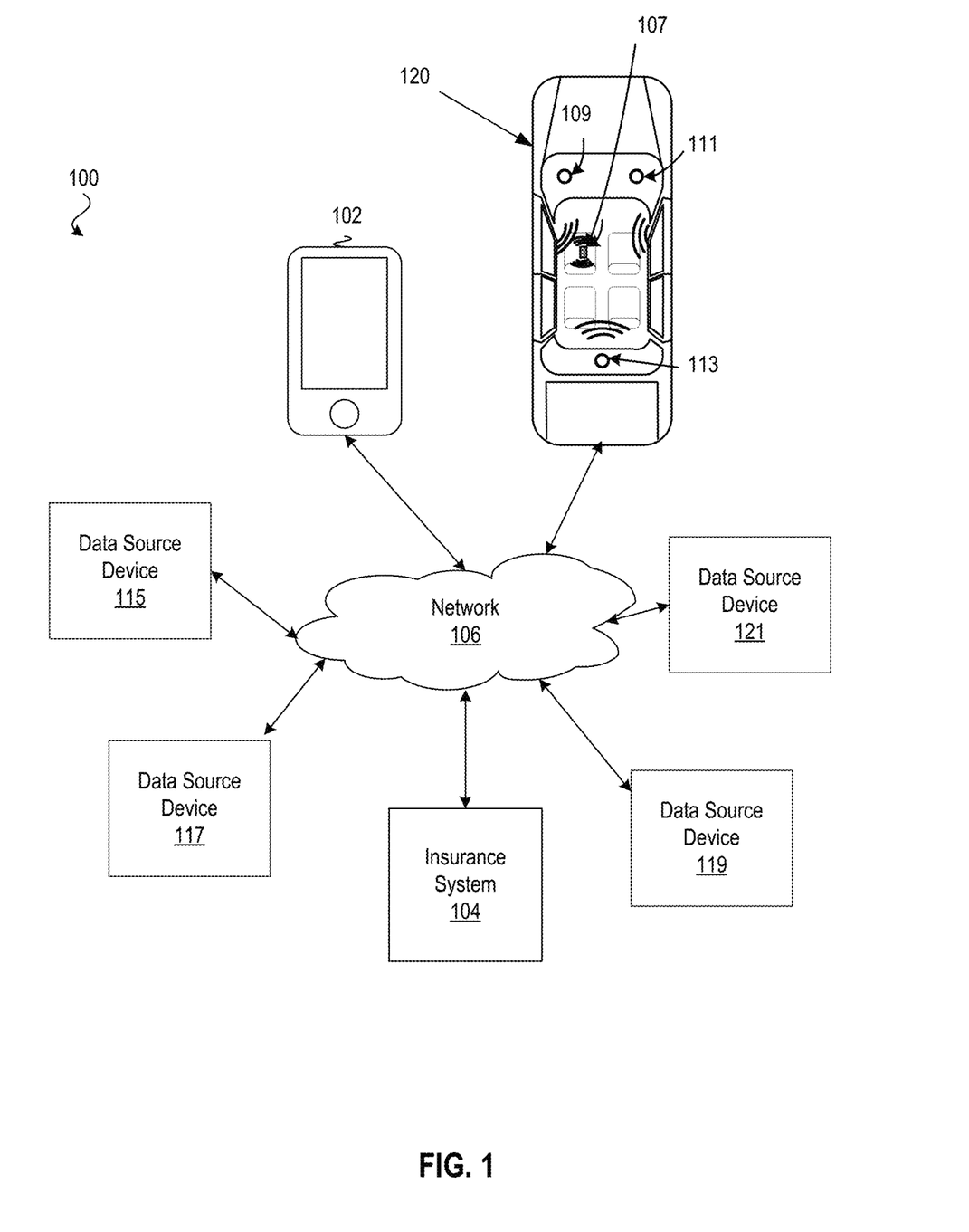
FIG. 1 is an example of an implementation of a system for adding or changing insurance coverage in accordance with an aspect of the disclosure.

Referring to FIG. 1, an example of an implementation of a system 100 for updating or changing insurance coverage is shown. As seen in FIG. 1, a mobile device 102 may be in signal communication with an insurance system 104 via a network 106. The mobile device 102 may be, e.g., a mobile telephone, a personal digital assistant (PDA), a palmtop computer, a tablet computer, and other types of mobile computing devices configurable to exchange communications via a communication network. It will be appreciated that the insurance system 104 may provide insurance information to other types of computing devices (such as desktop computers) that are also in signal communication with the insurance system via the network 106. The network 106 may be a wireless network such as a cellular network, a wired network such as the Internet, or a combination of a wired or wireless network.

FIG. 1 further illustrates a vehicle 120 which comprises one or more mobile communications devices 107 and one or more localization devices 109, 111, and 113. The localization devices 109, 111, and 113 may be appropriately attached to the interior surface of the vehicle to allow for unobstructed wireless communication between the one or more communications devices 107 and the one or more localization devices 109, 111, and 113.

In addition, FIG. 1 also illustrates data source devices 115, 117, 119, and 121. The data source devices 115, 117, 119, and 121 may be any handheld or other computing device configurable to provide data regarding its user. Such devices may include a mobile telephone, a personal digital assistant (PDA), a palmtop computer, a tablet computer, or other types of mobile computing devices configurable to exchange communications via a communication network.

In an embodiment, data such as location data or telematics data may be wirelessly transmitted from the mobile devices 102 or 107, the one or more data source devices 115, 117, 119, and 121, and/or the one or more localization devices 109, 111, and 113 to insurance system 104. The transmitted data may provide information pertaining to the location, movement, and behavior of the user and or information regarding the vehicle associated with the user.

For instance, a user of wireless communication device 102, 107 or data source devices 115, 117, 119, and 121 may communicate with a wireless access point. The wireless access point may comprise a cell site or cellular tower, for example. The wireless communication device or data source devices may comprise a mobile telephone with applications and other functionality (e.g., APPLE® iPhone, RESEARCH IN MOTION® Blackberry, Windows® mobile device, a mobile device using an Android based operating system, or other mobile telephone). The wireless communication device or data source devices may comprise a handheld mobile communications device with Wi-Fi connectivity (e.g., APPLE® iPad, Android tablet, Kindle, or the Samsung Galaxy, etc.). The wireless communication device or data source devices may be configured to communicate with a wireless access point such as a cellular tower operated which may be owned and operated by a cellular service provider. Alternatively, the wireless access point may be a Wi-Fi (i.e., compatible with IEEE 802.11a/b/g/n etc. wireless communication standards) hotspot where each device may obtain access to the Internet (e.g., to communicate using online chat applications or voice-over-IP applications).

Data may be transmitted from the wireless communication device, the data source devices, or the localization devices to one or more servers by way of the cell tower. The data may be transmitted from the cell tower to the one or more servers by way of using one or more wide area network (WANs), metropolitan area networks (MANs), and/or local area networks (LANs).

As illustrated in FIG. 1, a user may when driving have their wireless mobile communication device 107 located on their person in vehicle 120. Vehicle 120 may comprise an automobile, truck, mini-van, bus, sport utility vehicle (SUV), recreational vehicle, boat, airplane, train, motorcycle, or any other type of vehicle.

Wireless communication device 107 may communicate with one or more localization devices 109, 111, 113 that are placed within vehicle 120. Localization devices 109, 111, 113 may be positioned symmetrically within vehicle 120. The localization devices 109, 111, 113 may be placed, for example, at the sides of the front windshield and midline on the rear windshield as shown in FIG. 1. Alternatively, the localization devices 109, 111, 113 may be placed or positioned at various other locations within the vehicle.

Localization devices 109, 111, 113 may be used to determine the number of passengers located in vehicle 120. Furthermore, localization devices 109, 111, 113 may be used to communication information between communication devices located in vehicle 120.

The localization devices 109, 111, 113 may communicate with the wireless communication device 107 using Wi-Fi (IEEE 802.11a/b/g/n), Bluetooth, NFC (Near Field Communication), GSM, UMTS, and/or BLE (Bluetooth Low Energy) technologies. The localization devices 109, 111, 113 may transmit one or more signals using the one or more technologies. The one or more signals may be received by a receiver resident in the wireless communication device 107. In one embodiment, the transmission times of one or more received signals may be measured by the wireless communication device 107 to determine one or more distances between one or more localization devices 109, 111, 113 to the wireless communication device 107. The distances from the localization devices may be used to determine the location of the communication device 107.

The insurance system 104 may maintain and store insurance information for a user (e.g., the insurance user) associated with the mobile device 102 and/or 107. The insurance system 104 may store for instance information regarding the first and last name of the insurance user; the policy number for the insurance policy of the insurance user; coverage types and amounts; effective dates of the insurance policy; data regarding the insured items such as the make, model, and year of the vehicle insured under the insurance policy; and the contact information for the insurance user such as a mailing address, phone number, and email address. The insurance system 104 may also receive data from the user regarding their location or activities they are currently engaged in with the permission of the user. Such information may be used to automatically update a user's insurance policies and or coverage as will be discussed in further detail below.

Figure 2:
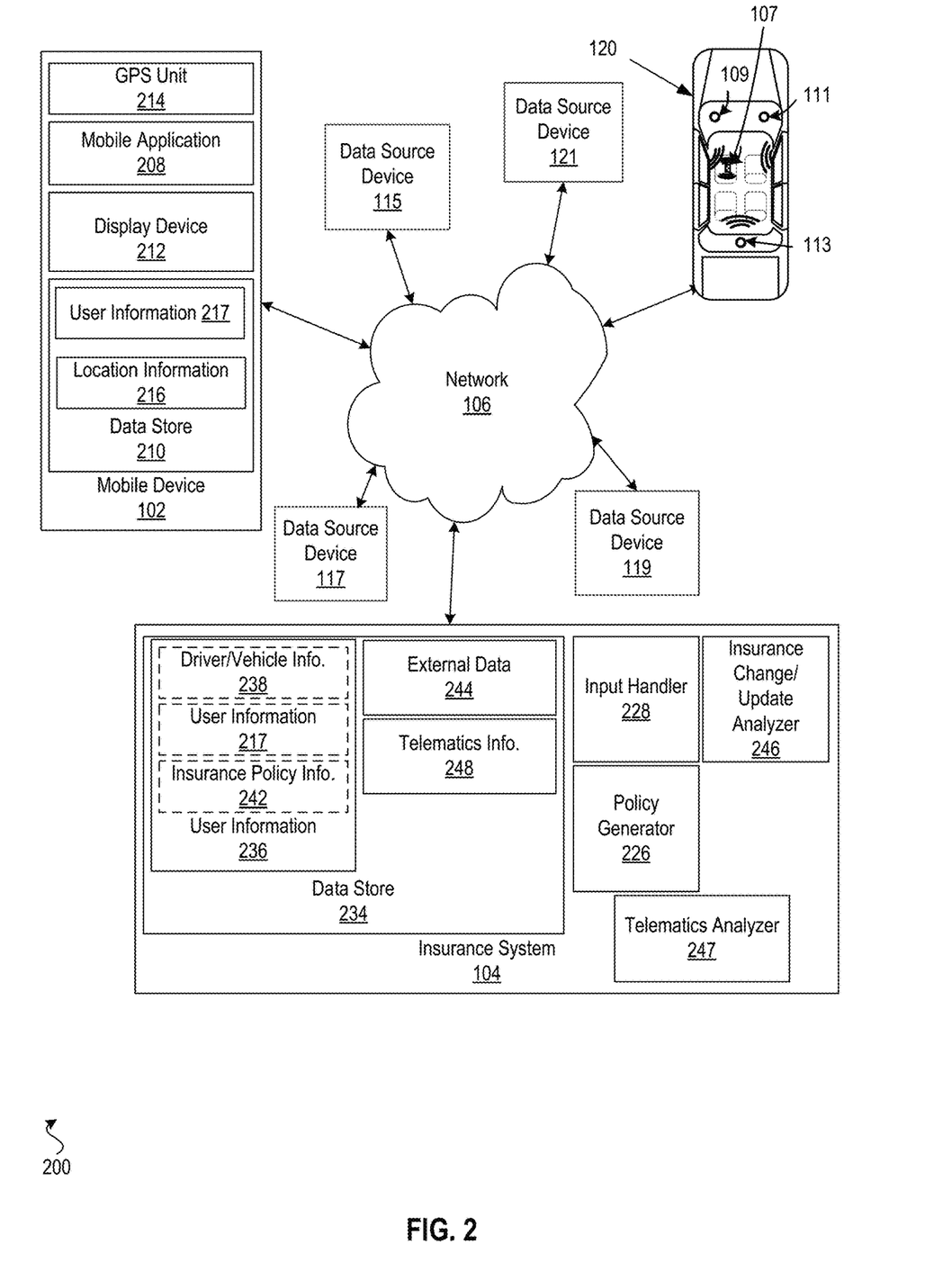
FIG. 2 is a block diagram of an example of an implementation of a system for adding or changing insurance coverage in accordance with an aspect of the disclosure.

Referring now to FIG. 2, a block diagram of an example of an implementation of a system 200 for adding or changing insurance coverage at a mobile device 102 is shown. As described above, the mobile device 102 may be in signal communication with an insurance system 104 via a network 106. The mobile device 102, in this example, includes a mobile application 208, a data store 210, a display device 212, and a Global Positioning System (GPS) unit 214.

The data store 210 of mobile device 102 may store information regarding location information 216 of an insurance user associated with mobile device 102. The data store 210 may also store additional data to be forwarded to the insurance system 104 with the user's permission. In addition, data store 201 may also include user information 217. The user information 217 or data may include movement and behavior data associated with the user or other information regarding the vehicle or other property associated with the user.

In order to protect the privacy of the information, mobile application 208, in some example implementations, may request that an insurance user agree the information may be provided to the insurance system 104. The mobile application, in this example, may record such an agreement from the insurance user and permit the transmitting of data to the insurance system 104.

The mobile application 208 may also query the GPS unit 214 for location information (e.g., latitude and longitude coordinates) that indicates the current geographic location of the mobile device 102. In an embodiment, the insurance system 104 may utilize the information in order to identify parties that were involved in an incident.

Referring now to the insurance system 104 in FIG. 2, an insurance company may implement the insurance system to maintain insurance information for its users and provide mechanisms to add or change insurance coverage. Accordingly, the insurance system 104 may include various components that facilitate adding or changing insurance coverage using a device such as mobile device 102 of a user.

In an embodiment, the insurance system 104 includes: a policy generator 226 that generates insurance policies based on the insurance information of insurance users; an input handler 228 that processes input received from mobile devices 102; and an insurance change/update analyzer that reviews additions, cancelations, and changes/updates to a user's insurance policies.

The insurance system 104, in this example, also includes a data store 234 that stores various types of insurance-related information. As shown by way of example in FIG. 2, the data store 234 stores user information 236 for the insurance users of the insurance company. The user information 236 may, for example, include: information 238 relating to one or more drivers or vehicles insured by the insurance company, e.g., the name, age, driver's license number, address, and contact information of a driver, the make, model, year, and color of a vehicle; information 242 relating to the insurance policies associated with the user, e.g., the insurance provider name, insurance provider contact information, insurance policy number, effective dates, and vehicles insured under the insurance policy; and user information 217 or data may include movement and behavior data associated with the user or other information regarding the vehicle or other property associated with the user. It will be appreciated that user information 217 may include additional or alternative information relating to the insurance user, a vehicle associated with the insurance user, or an insurance policy associated with the insurance user, and user activity information or other data associated with the user.

The data store 234 may include a database management system (DBMS) that facilitates storage and retrieval of information from the data store. Any data store and DBMS suitable for providing insurance-related services may be selectively employed. Moreover, it will be appreciated that the data store 234 may comprise multiple interconnected data stores. For example, the insurance system 104 may comprise an insurance user data store that stores information relating to insurance users, an insurance policy data store that stores information relating to insurance policies, and a vehicle telematics data store that stores vehicle telematics data received from the vehicles of insurance users.

In an embodiment, insurance system 104 may include an insurance change/update analyzer 246 to process and analyze the insurance changes and/or updates from the user.

Upon receipt of new data regarding the user, insurance change/update analyzer 246 may, for example, determine if the data indicates that an insurance policy modification is needed by the user.

In an embodiment, insurance change/update analyzer 246 may utilize telematics analyzer 247 to analyze telematics information 248 to determine whether an update or change to an insurance policy of the user is needed. For instance, data from a mobile device such as mobile device 102 coupled with received telematics data may indicate the number of passengers in a vehicle operated by the insurance user. Such information may be used to verify current automobile coverage of the user and to initiate updates to insurance coverage amounts based on the number of passengers in the vehicle. Such updates may include adding insurance riders or raising coverage amounts based on the number of passengers detected in the user's vehicle.

In an embodiment, telematics analyzer 247 may also be utilized to identify respective parties involved in an incident based on the telematics information. The data store 234 of insurance system 104 may store telematics information 248 received from the vehicles of users. Vehicle telematics data refers to technical information relating to the status or operation of a vehicle. Vehicle telematics data may include, for example, directional acceleration and deceleration (e.g., forward/backward, left/right, up/down), change in directional acceleration, vehicle speed or velocity, engine throttle and RPM (revolutions per minute), steering input, engagement of various vehicle subsystems (e.g., stability control systems, antilock brake systems), and the like. Those skilled in the art will appreciate that a vehicle telematics device may be configured to collect and record data relating to the operation and status of the vehicle. The vehicle telematics device may then provide the vehicle telematics data to, e.g., an insurance system for storage and analysis.

The telematics information 248 may include vehicle telematics data corresponding to the operation of the vehicles of insurance users. Telematics analyzer 247 may analyze telematics information 248 to identify telematics events that may be indicative of an incident involving the vehicle (e.g., a vehicle collision). Examples of telematics events that may correlate with vehicle incidents include a hard-braking event, a sudden stop event, and a hard turning event. The telematics information 248 may also identify the vehicle that provided the telematics information. Accordingly, an insurance user associated with the vehicle that provided the telematics information 248 may be determined. The telematics information 248 may also indicate the date, time, and location at which these events occurred.

In response to the determination that the insurance user was potentially involved in an incident, the insurance system 104 may initiate various responses including, notifying an insurance agent so that the insurance agent may contact the insurance user, automatically creating a placeholder insurance claim and populating the insurance claim with basic user information, and locating additional parties involved in the incident. It will be appreciated that the insurance change/update analyzer 246 may identify additional parties involved in the incident based on information received from the user's communication device 102 or other data source device 115, 117, 119, and 121.

In an aspect of the disclosure, mobile device 102 may transmit information to insurance system 104. The transmitted data may provide information pertaining to the location, movement, and behavior of the user and/or information regarding the vehicle associated with the user. The transmitted data may be analyzed by insurance change/update analyzer 246 or telematics analyzer 247. The transmitted data may be analyzed to determine the different types of activities a user may be engaged in or performing. For instance, data received for mobile device 102 may be analyzed to determine that a user regularly works out or performs rigorous activities. Such information may be used by insurance change/update analyzer 246 to provide various discounts or offer various riders to a user's insurance policies. In an embodiment, the discounts and riders may be applied automatically unless opted-out of by the user within a certain time period.

In another embodiment, mobile device 102 may transmit location information to insurance system 104 regarding the user. Insurance change/update analyzer 246 may determine based on the received information that a user frequently travels overseas to different countries. Based on the information, insurance change/update analyzer 246 may automatically apply travel insurance to a user's policy. The amounts of coverage may be determined by insurance change/update analyzer 246 and may be partially based on the countries being visited by the user. The user may receive an opt-out email or correspondence in which the automatically applied travel insurance coverage could be canceled if such a message was responded to by the user within a certain time period. The opt-out correspondence may include the additional premium cost and the temporary period for which it may apply.

In an embodiment, location information transmitted by a user may be used to determine if a user is currently residing at a primary home or at a secondary home or other residency. The analysis of location information over an extended time period may be used by insurance change/update analyzer 246 to determine if a user is on vacation and away from a primary residence for an extended period. Insurance change/update analyzer 246 may, based on analysis of the location data, determine that various insurance coverage at the primary residence may be suspended as the user is not currently occupying the primary residence. Alternatively, insurance change/update analyzer 246 may, based on analysis of the location data, determine that certain insurance coverage at the primary residence may be increased because the user is not currently occupying the primary residence. The changes or updates determined by insurance change/update analyzer 246 may be used by policy generator 226 to extend an insurance offer to the user. In an alternative embodiment, the changes or updates determined by the insurance change/update analyzer 246 may be automatically applied to the user's insurance policies.

Similarly, insurance change/update analyzer 246 may, based on the analysis of the location data, determine that insurance coverage at a secondary home or other residency may be altered because the user is currently occupying the property.

In an aspect of the disclosure, insurance changes or updates may be instant or seamless when switching from an occupied home to and non-occupied home (switching primary residence to vacation home). Such insurance changes or updates may be automatically detected and applied or in another embodiment be on demand when initiated by a user through a computing device.

In an aspect of the disclosure, user location information may be used to determine if an insurance user is shopping for a new automobile or home. The location information may be used to offer insurance coverage on any newly purchased automobile or home. The information may be automatically transmitted by the user's mobile device 102 or other data source device to insurance system 104. Insurance change/update analyzer 246 may analyze the data and determine that changes to a user's policies are to be offered or automatically applied based on the analysis. The policy changes may include new types of insurance or coverage amounts based on the determined needs.

In an aspect of the disclosure, weather information may be monitored and changes to insurance policies may be made based on current or future predicted weather conditions or patterns. For instance, potential for severe weather occurring near a user's residence or current location may be analyzed by insurance change/update analyzer 246 and changes to a user's policies may be offered or automatically applied based on the analysis. In addition, users located in the severe weather path may be offered additional coverage which may be automatically applied unless opted-out of by the user. The additional coverage may include traditional insurance policy peril protections such as wind or flood protection or services type protections such as storm recovery services protection, temporary lodging assistance protection and/or other needs based assistance protections. In an embodiment, the additional coverage or protections may be extended and/or automatically applied to users whose current determined locations fall within a predetermined distance to a storm's projected path.

In another aspect of the disclosure, behavior data associated with the user may be transmitted to insurance system 104. The behavior data may include data such as large purchases by a user for which property insurance or replacement insurance may be offered. For example, a jewelry purchase by a user may be detected by insurance change/update analyzer 246. Based on the detection, insurance change/update analyzer 246 may offer to a user a jewelry rider for the detected jewelry purchase. In another embodiment, a jewelry rider may be automatically applied to the user's insurance policy for a temporary period in order to protect the user from loss or until they decide if they want to permanently attach the rider. In a further embodiment, a jewelry rider may be automatically applied to the user's insurance policy unless or until removed by the user to ensure loss protection of the jewelry purchase.

In an aspect of the disclosure, large dollar amount purchases may also be detected by insurance change/update analyzer 246. Insurance change/update analyzer 246 may analyze purchases and may determine that insurance riders or binders be offered or automatically applied to a user's insurance policies based on the determination.

In an aspect of the disclosure, changes or updates to an insurance policy may be executed through an application provided on a user's computing device. The application may allow a user to alter or update insurance coverage through the user interface. For instance, a user may have various maintenance tasks performed on their home during the year by contractors. The maintenance tasks may include window cleaning, gutter cleaning, lawn maintenance, house painting or other seasonal type maintenance services. In an embodiment, a user may wish to obtain additional insurance coverage when these services are being performed on their home. For instance, a user may wish to increase insurance coverage when gutter cleaning is being performed on their home. In an embodiment, a user may through the application program interface increase policy coverage for a temporary time period. Such coverage updates or changes may be automatically applied up to a predetermined amount for a determined time period.

In another aspect of the disclosure, insurance premium reductions may be automatically applied based on the detection of maintenance completed on a user's home or maintenance completed on devices within the use's home. For instance, a detection device may indicate and determine that a sump pump is nearing the end of its usable life. Upon detection that the sump pump has been replaced or maintenance services have been performed on the sump pump, an instant insurance premium reduction may be applied to the user's insurance policy.

In another aspect of the disclosure, a user may suspend insurance coverage for temporary periods through the application user interface. For instance, a user may wish to suspend automobile insurance for their covered children while their children are away at college. In an embodiment, a user may remove various covered persons from their insurance policies for temporary periods by entering information through the user interface. In an embodiment, insurance change/update analyzer 246 may, based on location or other behavioral data, automatically determine that a user's covered children are currently away at college and adjust policy coverage based on that determination. The determination that insurance users children are away at college may be determined by insurance change/update analyzer 246 analyses of location data collected by data source devices 117 and other user information data stored in data store 234.

In another embodiment, a user may through an application interface apply instant changes or updates to their coverage. For example, a user may through an application interface add drop a driver on an automobile, add or drop liability insurance on an automobile or home, and eliminate certain portions of insurance when the insured item is not being used (ex. automobile). Those skilled in the art will realize that many additional changes and/or updates may be made via the application interface to the user's policies.

In yet another aspect of the disclosure, a user may receive offers for particular types of insurance when user is potentially in need of such insurance. For instance, if a weather forecast indicates a tornado within a certain distance from a user's home or property, the insurance change/update analyzer 246 may extend an offer for additional insurance to the user. In an embodiment, the insurance change/update analyzer 246 may automatically apply the additional insurance coverage based on predetermined amounts or thresholds.

In another embodiment, a user may receive different levels or types of insurance depending on the user's usage. For instance, insurance may be automatically applied to a user's policy with the user only paying for the additional insurance when the user actually needs the additional insurance (ex. such as third party liability insurance when multiple individuals are detected in a home).

In an embodiment, the user of the insurance may be a small business or other entity wherein obtaining instance coverage or instant coverage changes to a policy would be beneficial. For example, a restaurant may want additional insurance coverage when hosting larger parties or gathering that exceed normal daily operations.

Figure 3:
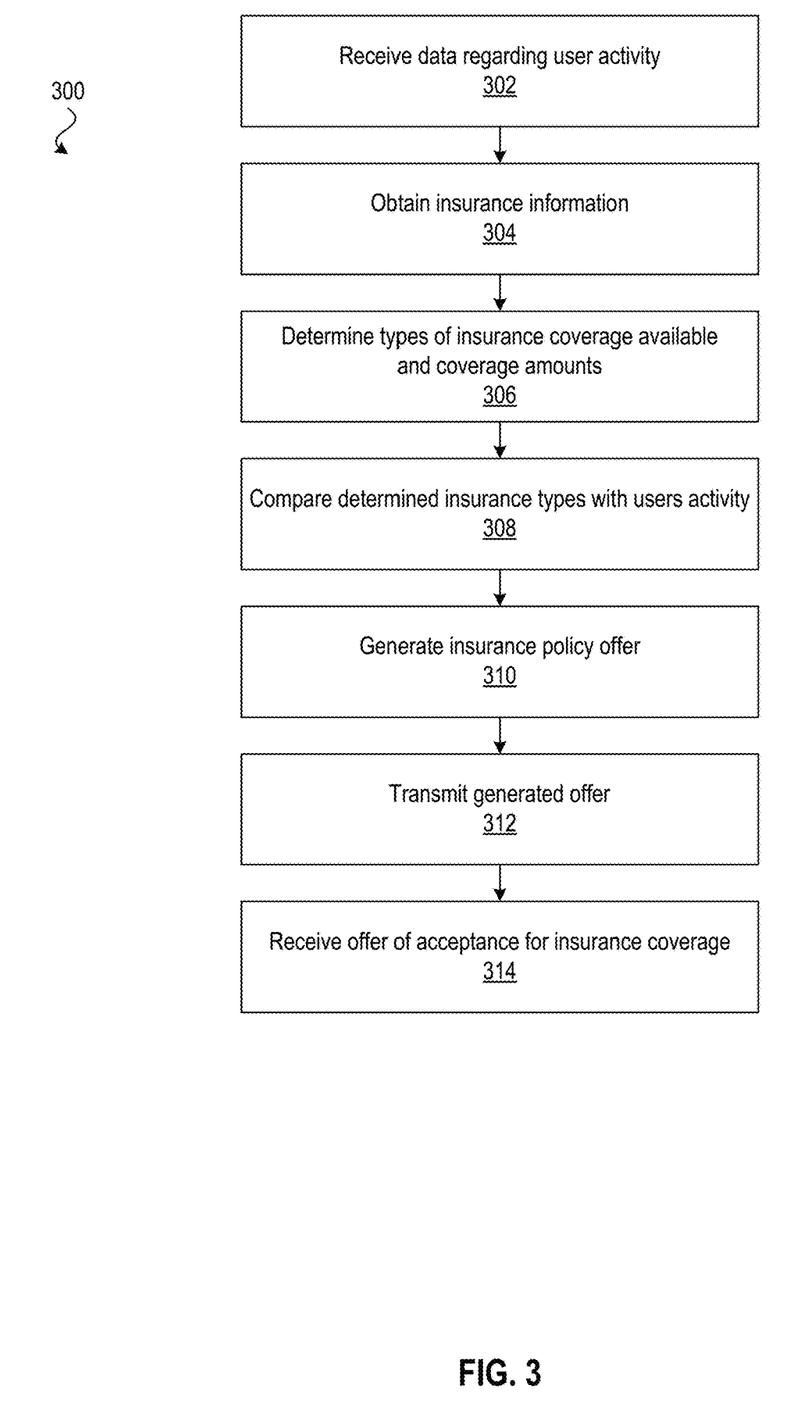
FIG. 3 is a flowchart of exemplary method steps for changing or updating an insurance policy in accordance with an aspect of the disclosure.

Referring now to FIG. 3, a flowchart 300 illustrates exemplary method steps for changing or updating a user's policy in accordance with an aspect of the disclosure. In step 302, an insurance system such as insurance system 104 receives data regarding an insurance user's activity. In an embodiment, an insurance change/update analyzer 246 of insurance system 104 may obtain insurance information regarding the insurance user as shown in step 304. The insurance information may be stored in data store 104.

In step 306, the insurance change/update analyzer 246 may determine types of insurance coverage available to the user along with available coverage amounts. The insurance change/update analyzer 246 may compare the determined insurance types with the received user activity data as shown in step 308. In step 310, an insurance policy offer may be generated. The offer may be generated and transmitted to the insurance user as indicated in step 312. In an embodiment, an offer of acceptance may be received by the insurance system 104 as shown in step 314.

Figure 4:
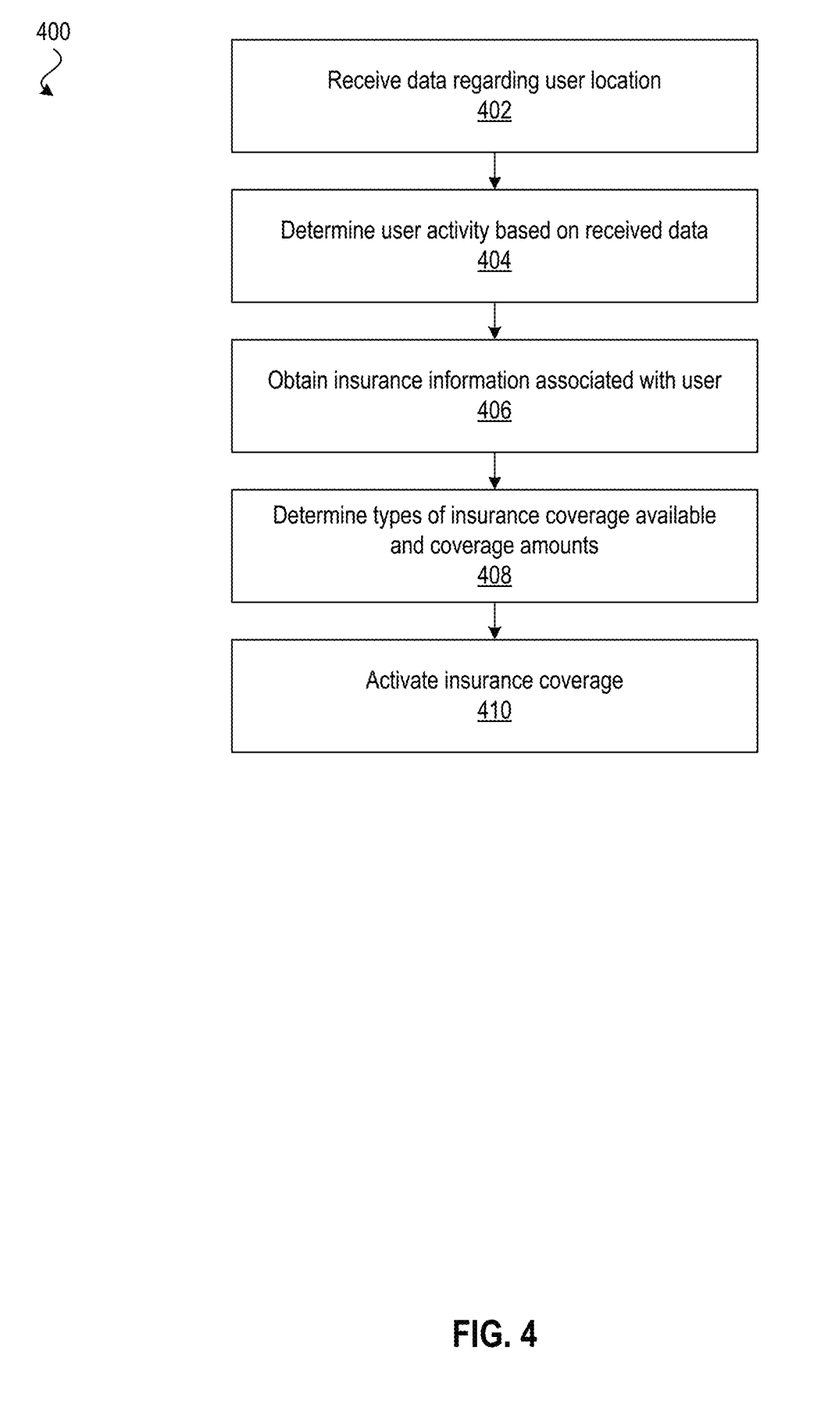
FIG. 4 is an additional exemplary flowchart for changing or updating an insurance policy in accordance with an aspect of the disclosure.

Referring now to FIG. 4, a flowchart 400 illustrates exemplary method steps for changing or updating a user's insurance policy in accordance with an aspect of the disclosure. In step 402, an insurance system such as insurance system 104 receives data regarding an insurance user's location. An insurance change/update analyzer 246 of insurance system 104 may determine a user's activity based on the received user location data in step 404.

The insurance change/update analyzer 246 of insurance system 104 may obtain insurance information regarding the insurance user as shown in step 406. The insurance information may be stored in data store 104.

In step 408, insurance change/update analyzer 246 may determine types of insurance coverage available to the user along with available coverage amounts. The insurance change/update analyzer 246 may compare the determined insurance types with the determined user activity. In step 410, insurance change/update analyzer 246 may activate new coverage and apply appropriate riders or change insurance coverage amounts based on the determined types and coverage amounts available to adequately protect the insurance user.

Figure 5A:
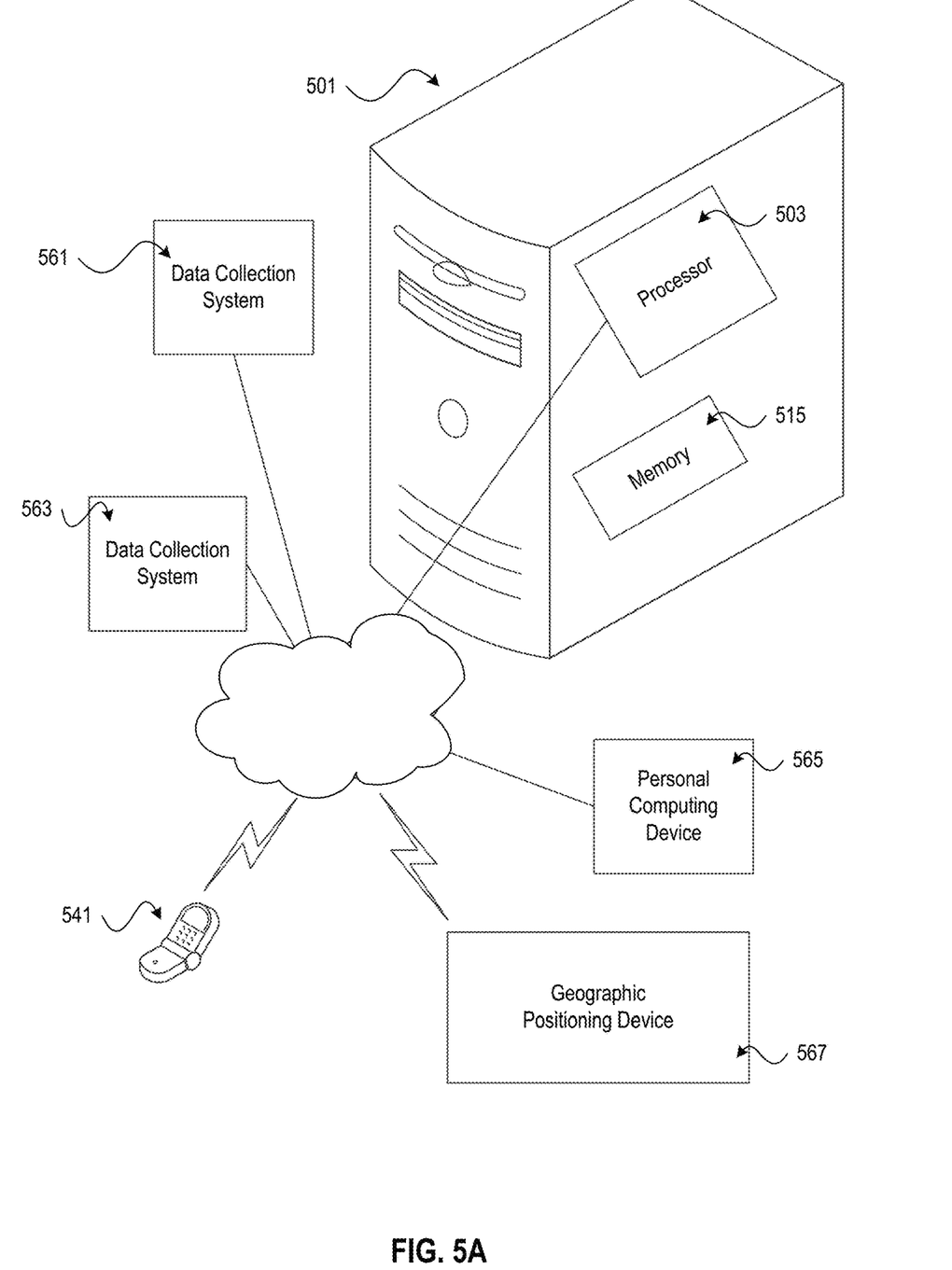
FIG. 5A is an example of an implementation of a suitable operating environment in which various aspects of the disclosure may be implemented.

Referring to FIG. 5A, an example of an implementation of a suitable operating environment in which various aspects of the disclosure may be implemented is shown. The operating environment is only one example of a suitable operating environment and is not intended to suggest any limitation as to the scope of use or functionality of the disclosure. The operating environment may be comprised of one or more data collection systems 561, 563 in communication with computing device 501. The computing device 501 may use information communicated from the data collection systems 561, 563 to generate values that may be stored in a database format. In one embodiment, the computing device 501 may be a high-end server computer with one or more processors 503 and one or more memories 515 for storing and maintaining the values generated. The memories 515 storing and maintaining the values generated need not be physically located in the computing device 501. Rather, the memories (e.g., ROM 505, RAM 505, flash memory, hard drive memory, RAID memory, and the like) may be located in a remote data store (e.g., memory storage area 227) physically located outside the computing device 501, but in communication with the computing device 501.

A personal computing device 565 (e.g., a personal computer, tablet PC, handheld computing device, personal digital assistant, mobile device, etc.) may communicate with the computing device 501. Similarly, a geographic positioning device 567 (e.g., a global positioning system (GPS), geographic information system (GIS), satellite navigation system, mobile device, other location tracking device, and the like) may communicate with the computing device 501. The communication between the computing device 501 and the other devices or systems 565, 567 may be through wired or wireless communication networks or direct links. One or more networks may be in the form of a local area network (LAN) that has one or more of the well-known LAN topologies and may use a variety of different protocols, such as Ethernet. One or more of the networks may be in the form of a wide area network (WAN), such as the Internet. The computing device 501 and other devices may be connected to one or more of the networks via twisted pair wires, coaxial cable, fiber optics, radio waves or other media. The term "network" as used herein and depicted in the drawings should be broadly interpreted to include not only systems in which devices or data sources are coupled together via one or more communication paths, but also stand-alone devices that may be coupled, from time to time, to such systems that have storage capability.

In another embodiment in accordance with aspects of the disclosure, a geographic positioning device 567 may operate in a stand-alone manner by locally storing some of the database of values stored in the memories 515 of the computing device 501. For example, a geographic positioning device 567 (e.g., a GPS in an automobile) may be comprised of a processor, memory, input devices 568, and output devices 569 (e.g., keypad, display screen, speaker, and the like). The memory may be comprised of a non-volatile memory that stores a database of values. Therefore, the geographic positioning device 567 need not communicate, in one example, with a computing device 501 located at a remote location. Rather, the geographic positioning device 567 may behave in a stand-alone manner and use its processor to perform particular steps disclosed herein. If desired, the geographic positioning device 567 may be refreshed with an updated database of values after a period of time.

In yet another embodiment in accordance with aspects of the disclosure, a personal computing device 565 may operate in a stand-alone manner by locally storing some of the database of values stored in the memory of the computing device. For example, a personal computing device 565 may be comprised of a processor, memory, input device (e.g., keypad, CD-ROM drive, DVD drive, etc.), and output device (e.g., display screen, printer, speaker, etc.). The memory may be comprised of CD-ROM media. Therefore, the personal computing device 565 may use the input device to read the contents of the CD-ROM media. Rather, the personal computing device 565 may behave in a stand-alone manner and use its processor to perform particular steps disclosed herein. If desired, the personal computing device may be provided with an updated database of values (e.g., in the form of updated CD-ROM media) after a period of time.

The data collection systems 561, 563 may provide information to the computing device 501. In one embodiment in accordance with aspects of the disclosure, a data collection system may be a computer which contains memory storing data and is configured to provide information to the computing device 501. Some examples of providers of data collection systems in accordance with aspects of the disclosure include, but are not limited to, insurance companies, third-party insurance data providers, government entities, state highway patrol departments, local law enforcement agencies, state departments of transportation, federal transportation agencies, traffic information services, road hazard information sources, construction information sources, weather information services, geographic information services, vehicle manufacturers, vehicle safety organizations, and environmental information services. For privacy protection reasons, in some embodiments of the disclosure, access to the information in the data collection systems 561, 563 may be restricted to only authorized computing devices 501 and for only permissible purposes. For example, access to the data found on the data collection systems may be restricted to only those persons or entities that have signed an agreement (e.g., an electronic agreement) acknowledging their responsibilities with regard to the use and security to be accorded this information.

The computing device 501 may use the information from the data collection systems 561, 563 to generate values that may be used in generated new insurance policies or to make changes or updates to existing insurance policies. Some examples of the information that the data collection systems may provide to the computing device 501 include, but are not limited to, accident information, geographic information, event information, calendar information, behavioral information, contact information, and other types of information useful to update or change insurance policies.

Figure 5B:
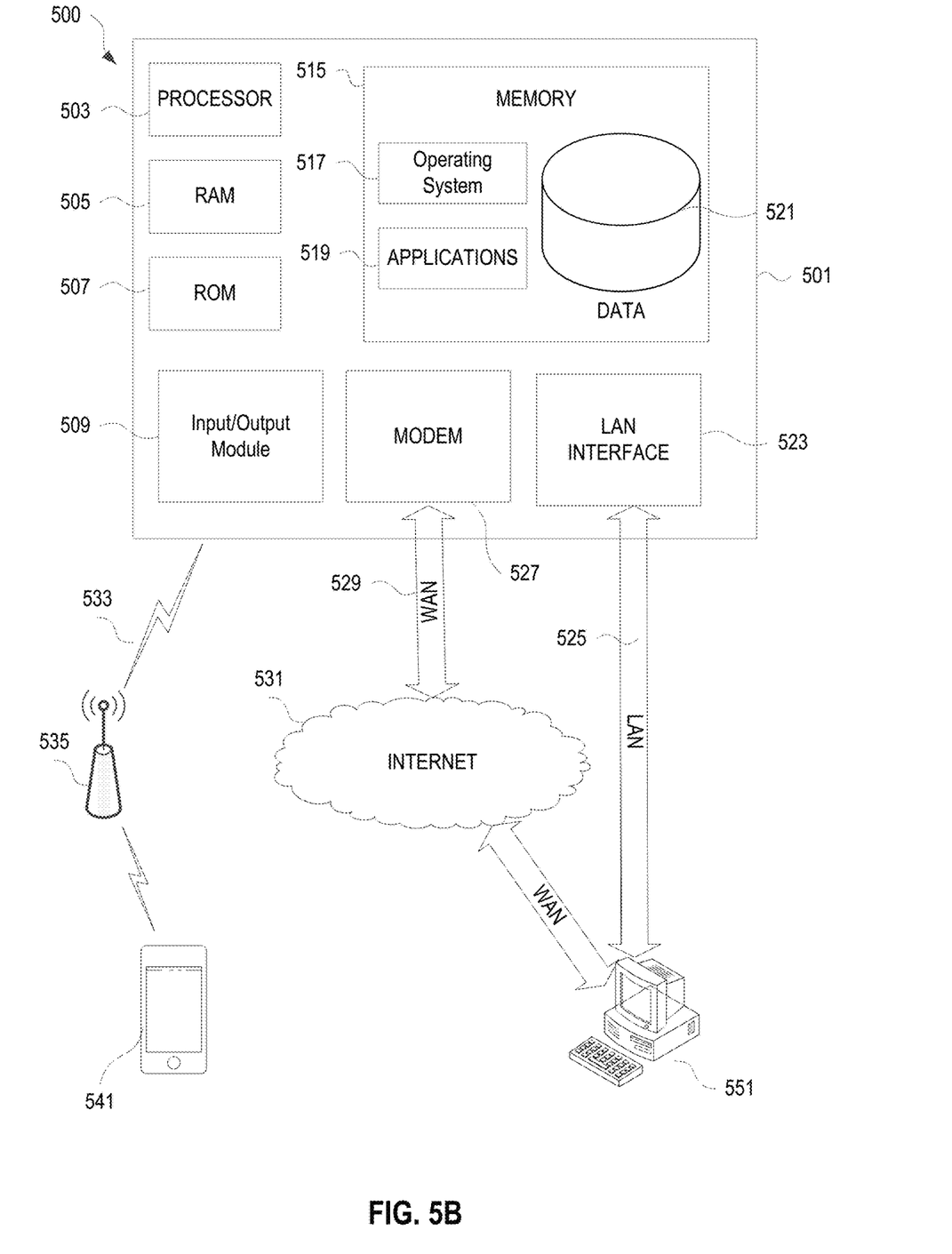
FIG. 5B is a block diagram of a system that may be used according to one or more example embodiments of the disclosure.

FIG. 5B illustrates a block diagram of a computing device (or system) 501 in the communication system 500 that may be used according to one or more illustrative embodiments of the disclosure. The device 501 may have a processor 503 for controlling overall operation of the device 501 and its associated components, including RAM 505, ROM 507, input/output (I/O) module 509, and memory 515. The computing device 501, along with one or more additional devices (e.g., terminals 541, 551) may correspond to any of multiple systems or devices, such as a system for maintaining current insurance information at a mobile device (FIG. 2), configured as described herein for providing insurance card images and responding to message indicating display of the insurance card image.

I/O module 509 may include a microphone, keypad, touch screen, and/or stylus through which a user of the computing device 501 may provide input, and may also include one or more of a speaker for providing audio output and a video display device for providing textual, audiovisual or graphical output. Software may be stored within memory 515 or storage to provide instructions to processor 503 for enabling device 501 to perform various functions. For example, memory 515 may store software used by the device 501, such as an operating system 517, application programs 519, and an associated internal database 521. Processor 503 and its associated components may allow the system to execute a series of computer-readable instructions.

The system may operate in a networked environment supporting connections to one or more remote computers, such as terminals 541 and 551. The terminals 541 and 551 may be personal computers, servers (e.g., web servers, database servers), or mobile communication devices (e.g., vehicle telematics devices, on-board vehicle computers, mobile phones, portable computing devices, and the like), and may include some or all of the elements described above with respect to the system 501. The network connections may include a local area network (LAN) 525 and a wide area network (WAN) 529, and a wireless telecommunications network 533, but may also include other networks. When used in a LAN networking environment, the system may be connected to the LAN 525 through a network interface or adapter 523. When used in a WAN networking environment, the system 501 may include a modem 527 or other means for establishing communications over the WAN 529, such as network 531 (e.g., the Internet). When used in a wireless telecommunications network 533, the system 501 may include one or more transceivers, digital signal processors, and additional circuitry and software for communicating with wireless computing devices 541 (e.g., mobile phones, vehicle telematics devices) via one or more network devices 535 (e.g., base transceiver stations) in the wireless network 533.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and system components described herein may be configured to communicate using any of these network protocols or technologies.

Additionally, one or more application programs 519 used by the system may include computer executable instructions for updating or changing insurance policies and for performing other related functions as described herein.

While the disclosure has been described with respect to specific examples including presently illustrative modes of carrying out the disclosure, a person having ordinary skill in the art, after review of the entire disclosure herein, will appreciate that there are numerous variations and permutations of the above-described systems and techniques that fall within the spirit and scope of the disclosure.

What is claimed is:

1. A method of changing insurance policy coverage comprising:
   automatically initiating retrieval by a computing device and from a user device associated with an insurance user in wireless communication with the computing device, of monitored location-based data comprising (i) location information collected by a geographic positioning device associated with the user device, (ii) telematics data from one or more sensors associated with a vehicle of the insurance user, and (iii) localization data from a plurality of localization devices attached to and positioned about an interior of the vehicle, wherein the plurality of localization devices wirelessly communicate with one or more wireless communication devices positioned within the vehicle to determine a position of each of the one or more wireless communication devices based on a transmission time of a signal from the plurality of localization devices to each of the one or more wireless communication devices and associate the position of each of the one or more wireless communication devices with a position respectively corresponding to a passenger of a number of passengers located within the vehicle;
   automatically retrieving, by the computing device, insurance information associated with the insurance user, the insurance information comprising a current insurance policy of the insurance user;
   automatically analyzing, by a server of the computing device, the server comprising an insurance change/update analyzer, (i) the location information collected by the geographic positioning device, (ii) the telematics data from the one or more sensors, and (iii) the localization data from the plurality of localization devices to identify, based on the current insurance policy, whether an insurance user activity representative of at least one of a passenger location change or a vehicle location change based on the monitored location-based data has occurred that warrants an insurance policy modification for the current insurance policy associated with the insurance user, wherein the insurance user activity representative of the at least one of the passenger location change or the vehicle location change includes (i) a change in a location of the insurance user based on the location information as the monitored location-based data, (ii) a change in a location of the vehicle based on the telematics data as the monitored location-based data, and/or (iii) an update of the number of passengers within the vehicle based on the localization data as the monitored location-based data;
   in response to identifying that an insurance modification is warranted based on whether the insurance user activity representative of the at least one of the passenger location change or the vehicle location change based on the monitored location-based data has occurred, determining, by the computing device and using the determined insurance user activity, one or more types of insurance coverage available;
   comparing, by the computing device, the determined one or more types of insurance coverage available with the current insurance policy;
   automatically generating, by the server of the computing device and based on the comparing, an insurance policy offer;
   transmitting, by the computing device and to the user device, the generated insurance policy offer;
   causing, by the computing device, the user device to display via a user interface of the user device the generated insurance policy offer and a request for the insurance user to accept the generated insurance policy offer via the user interface;
   receiving, from the user device, an indication that the insurance user accepts the generated insurance policy offer; and
   in response to receiving the indication that the insurance user accepts the generated insurance policy offer, automatically updating the current insurance policy with the generated insurance policy offer to provide an updated insurance policy and generating an insurance card image associated with the updated insurance policy offer and displaying the insurance card image via the user interface of the user device.

2. The method of claim 1, further comprising:
   in response to receiving the indication that the insurance user accepts the generated insurance policy offer, automatically enrolling the insurance user in the generated insurance policy offer.

3. The method of claim 1, further comprising analyzing the location information to determine weather conditions for a location associated with the location information and determine whether the weather conditions warrant the insurance policy modification.

4. The method of claim 3, further comprising, based on the determination that the insurance policy modification is warranted, adjusting the generated insurance policy offer based on the determined weather conditions for the location.

5. The method of claim 1, wherein the location information is collected by a global processing system (GPS) receiver of the user device, and wherein the location information comprises GPS coordinates.

6. The method of claim 1, wherein analyzing the location information further comprises:
   analyzing the location information to determine locations indicating international travel; and
   determining whether the locations indicating international travel warrant the insurance policy modification.

7. The method of claim 6, wherein generating the insurance policy offer further comprises:
   based on determining that the insurance policy modification is warranted, generating the insurance policy offer to modify the current insurance policy of the insurance user to include travel insurance.

8. The method of claim 7, further comprising determining a time period for which the modification to the current insurance policy applies.

9. The method of claim 1, further comprising:
receiving, by a computing device and from the user device, movement data associated with the insurance user;
analyzing the movement data to determine an exercise pattern of the insurance user; and
determining whether the exercise pattern of the insurance user warrant the insurance policy modification.

10. The method of claim 9, wherein generating the insurance policy offer further comprises:
based on determining that the insurance policy modification is warranted, generating the insurance policy offer to provide a discount to the current insurance policy of the insurance user.

11. A method of changing insurance policy coverage comprising:
automatically initiating retrieval, by a computing device and from a user device comprising a user interface and associated with an insurance user, the user device in wireless communication with the computing device, of monitored location-based data comprising (i) location information collected by a geographic positioning device associated with the user device, (ii) telematics data from one or more sensors associated with a vehicle of the insurance user, and (iii) localization data from plurality of localization devices attached to and positioned about an interior of the vehicle, wherein the plurality of localization devices wirelessly communicate with one or more wireless communication devices positioned within the vehicle to determine a position of each of the one or more wireless communication devices based on a transmission time of a signal from the plurality of localization devices to each of the one or more wires communication devices and associate the position of each of the one or more wireless communication devices with a position respectively corresponding to a passenger of a number of passengers located in the vehicle;
automatically retrieving, by the computing device, insurance information associated with the insurance user, the insurance information comprising a current insurance policy of the insurance user;
automatically analyzing, by a server of the computing device, the server comprising an insurance change/update analyzer, (i) the location information collected by the geographic positioning device, (ii) the telematics data from the one or more sensors, and (iii) the localization data from the plurality of localization devices to identify, based on the current insurance policy, whether an insurance user activity representative of at least one of a passenger location change or a vehicle location change based on the monitored location-based data has occurred that warrants an insurance policy modification to the current insurance policy associated with the insurance user, wherein the insurance user activity representative of the at least one of the passenger location change or the vehicle location change includes (i) a change in a location of the insurance user based on the location information as the monitored location-based data, (ii) a change in a location of the vehicle based on the telematics data as the monitored location-based data, and/or (iii) an update of the number of passengers within the vehicle based on the localization data as the monitored location-based data;
in response to identifying that an insurance modification is warranted based on whether the insurance user activity representative of the at least one of the passenger location change or the vehicle location change based on the monitored location-based data has occurred, determining, by the computing device, one or more types of insurance coverage and coverage amounts available and associated with the monitored location-based data;
automatically updating the current insurance policy by the server of the computing device based on the determined one or more types of insurance available to provide an updated insurance policy; and
in response to automatically updating the current insurance policy, automatically generating an insurance card image associated with the updated insurance policy and displaying the insurance card image via the user interface of the user device.

12. The method of claim 11, further comprising:
adjusting a coverage amount for the updated insurance policy to a default level based on the determined coverage amounts available.

13. The method of claim 11, further comprising:
receiving, from the computing device, updated monitored location-based data; and
based on the received updated monitored location-based data, deactivating the activated insurance coverage.

14. A system, comprising:
a server comprising:
a server processor; and
a server memory storing computer-readable instructions, including insurance change/update logic that, when executed by the processor, cause the server to automatically:
initiate retrieval, from a user device comprising a user interface and associated with an insurance user, the user device in wireless communication with the server, of monitored location-based data comprising (i) location data collected by a geographic positioning device associated with the user device, (ii) telematics data from one or more sensors associated with a vehicle of the insurance user, and (iii) localization data from a plurality of localization devices attached to and positioned about an interior of the vehicle, wherein the plurality of localization devices wirelessly communicate with one or more wireless communication devices positioned within the vehicle to determine a position of each of the one or more wireless communication devices based on a transmission time of a signal from the plurality of localization devices to each of the one or more wireless communication devices and associate the position of each of the one or more wireless communication devices with a position respectively corresponding to a passenger of a number of passengers located within the vehicle;
retrieve insurance information associated with the insurance user, the insurance information comprising a current insurance policy of the insurance user;
analyze the (i) the location data collected by the geographic positioning device, (ii) the telematics data from the one or more sensors, and (iii) the localization data from the plurality of localization devices to identify, based on the current insurance policy, whether an insurance user activity representative of at least one of a passenger location change or a vehicle location change based on the monitored location-based data has occurred that warrants an insurance policy modification to the current insurance policy associated with the insurance user, wherein the insurance user activity representative of the at least one of the passenger location change or the vehicle location change includes (i) a change in a location of the insurance user based on the location information as the monitored location-based data, (ii) a change in a location of the vehicle based on the telematics data as the monitored location-based data, and/or (iii) an update of the number of passengers within the vehicle based on the localization data as the monitored location-based data;

in response to identifying that an insurance modification is warranted based on whether the insurance user activity representative of the at least one of the passenger location change or the vehicle location change based on the monitored location-based data has occurred, determine one or more types of insurance coverage available and coverage amounts available and associated with the monitored location-based data;

update the current insurance policy based on the determined one or more types of insurance available to provide an updated insurance policy; and in response to the updated insurance policy, automatically generate an insurance card image associated with the updated insurance policy and display the insurance card image via the user interface of the user device;

a geographic positioning device comprising:
 a second processor; and
 a second memory storing computer-readable instructions that, when executed by the second processor, cause the geographic positioning device to:
  collect the location data; and
  send, via the user device, the location data to the server.

15. A non-transitory, computer-readable medium having insurance change/update logic stored thereon that, when executed by a processor, cause the processor to automatically:

initiate retrieval, from a user device associated with an insurance user and in wireless communication with the processor, of monitored location-based data comprising (i) location information collected by a geographic positioning device associated with the user device, (ii) telematics data from one or more sensors associated with a vehicle of the insurance user, and (iii) localization data from a plurality of localization devices attached to and positioned about an interior of the vehicle, wherein the a plurality of localization devices wirelessly communicate with one or more wireless communication devices positioned within the vehicle to determine a position of each of the one or more wireless communication devices based on a transmission time of a signal from the plurality of localization devices to each of the one or more wireless communication devices and associate the position of each of the one or more wireless communication devices with a position respectively corresponding to a passenger of a number of passengers located within the vehicle;

retrieve insurance information associated with the insurance user, the insurance information comprising a current insurance policy of the insurance user;

analyze (i) the location information collected by the geographic positioning device, (ii) the telematics data from the one or more sensors, and (iii) the localization data from the plurality of localization devices to identify, based on the current insurance policy, whether an insurance user activity representative of at least one of a passenger location change or a vehicle location change based on the monitored location-based data has occurred that warrants an insurance policy modification to the current insurance policy associated with the insurance user, wherein the insurance user activity representative of the at least one of the passenger location change or the vehicle location change includes (i) a change in a location of the insurance user based on the location information as the monitored location-based data, (ii) a change in a location of the vehicle based on the telematics data as the monitored location-based data, and/or (iii) an update of the number of passengers within the vehicle based on the localization data as the monitored location-based data;

in response to identifying that an insurance modification is warranted based on whether the insurance user activity representative of the at least one of the passenger location change or the vehicle location change based on the monitored location-based data has occurred, determine one or more types of insurance coverage available and associated with the determined insurance user activity;

compare the determined one or more types of insurance coverage available with the current insurance policy;

generate, based on the comparing, an insurance policy offer;

transmit, to the user device, the generated insurance policy offer;

cause the user device to display via a user interface of the user device the generated insurance policy offer and a request for the insurance user to accept the generated insurance policy offer via the user interface;

receive, from the user device, an indication that the insurance user accepts the generated insurance policy offer;

in response to receiving the indication that the insurance user accepts the generated insurance policy offer, automatically update the current insurance policy with the generated insurance policy offer to provide un updated insurance policy and generate an insurance card image associated with the updated insurance policy offer and display the insurance card image via the user interface of the user device.

16. The non-transitory, computer-readable medium of claim 15, wherein the processor is further caused to:
in response to receiving the indication that the insurance user accepts the generated insurance policy offer, automatically enroll the insurance user in the generated insurance policy offer.

17. The non-transitory, computer-readable medium of claim 15, wherein the processor is further caused to analyze the location information to determine weather conditions for a location associated with the location information and determine whether the weather conditions warrant the insurance policy modification.

18. The non-transitory, computer-readable medium of claim 17, wherein the processor is further caused to adjust the generated insurance policy offer based on the determined weather conditions for the location.

19. The non-transitory, computer-readable medium of claim 15, wherein the insurance user activity comprises international travel.

* * * * *